US006641180B2

(12) United States Patent
Udhoefer

(10) Patent No.: US 6,641,180 B2
(45) Date of Patent: Nov. 4, 2003

(54) SCREW CONNECTION

(75) Inventor: Andreas Udhoefer, Gutersloh (DE)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/224,447

(22) Filed: Aug. 19, 2002

(65) Prior Publication Data

US 2003/0020278 A1 Jan. 30, 2003

Related U.S. Application Data

(63) Continuation of application No. PCT/DE01/00841, filed on Mar. 3, 2001.

(30) Foreign Application Priority Data

Mar. 7, 2000 (DE) .......................................... 101 11 146

(51) Int. Cl.$^7$ ................................................ F16L 19/00
(52) U.S. Cl. ...................... 285/382.7; 285/93; 285/342; 403/27
(58) Field of Search ................. 285/93, 342, 382.7; 403/27

(56) References Cited

U.S. PATENT DOCUMENTS

| | | | | |
|---|---|---|---|---|
| 2,693,374 A | * | 11/1954 | Wurzburger | 285/343 |
| 2,749,152 A | * | 6/1956 | Courtot | 285/342 |
| 2,943,871 A | * | 7/1960 | St. Clair | 285/342 |
| 3,075,793 A | * | 1/1963 | Lennon et al. | 285/342 |
| 3,707,302 A | * | 12/1972 | Hiszpanski | 285/116 |
| 4,309,050 A | * | 1/1982 | Legris | 285/341 |
| 4,317,585 A | * | 3/1982 | Boice | 285/93 |
| 4,438,953 A | * | 3/1984 | Timme, Jr. | 285/93 |
| 4,630,851 A | * | 12/1986 | Ogawa | 285/341 |
| 4,958,859 A | * | 9/1990 | Konrad et al. | 285/39 |
| 6,073,976 A | * | 6/2000 | Schmidt et al. | 285/341 |

FOREIGN PATENT DOCUMENTS

| | | | | |
|---|---|---|---|---|
| DE | 1 296 901 | * | 7/1971 | 285/342 |
| DE | 3341726 A1 A | | 9/1984 | |
| DE | 39 221 74 C1 | * | 12/1990 | 285/342 |
| DE | 4229502 C2 | | 5/1994 | |
| EP | 0 140 060 A2 | * | 9/1984 | 285/342 |
| GB | 1110952 | * | 4/1968 | 285/342 |
| GB | 1340473 | | 12/1973 | |
| JP | 4-266685 | * | 9/1992 | 285/342 |
| WO | WO 93/25837 | | 12/1993 | |
| WO | WO 01/66989 A1 | | 9/2001 | |

* cited by examiner

Primary Examiner—Lynne H. Browne
Assistant Examiner—James M. Hewitt
(74) Attorney, Agent, or Firm—Joseph J. Pophal

(57) ABSTRACT

A screw connection including a sealing ring, a connecting piece, and a union nut for assembling a tube connector. The sealing ring has a nut side portion with an annular reinforcement on its outer face, a narrow ring portion, a ring surface with transfer elements arranged on its annular face located at the transition between the narrow ring portion and the nut side portion, and at least one cutting edge on its interior surface. The annular face having an inclination between 45° and 90° relative to the longitudinal axis of the tube connection. The connecting piece has an end face located at a first axial end and a conical bore disposed within. When fully assembled, the narrow ring portion is positioned with said conical bore, contacts the connecting piece, and transfers a negative image of the transfer elements on the ring surface onto the connecting piece end face.

32 Claims, 3 Drawing Sheets

US 6,641,180 B2

SCREW CONNECTION

CROSS REFERENCE TO RELATED APPLICATIONS

This application is a continuation of copending International Application No. PCT/DE01/00841 filed Mar. 3, 2001, which designated the United States, and which claims priority to German Patent Application 10011146.7, filed Mar. 7, 2000, the disclosures of which are incorporated herein by reference.

BACKGROUND OF THE INVENTION

The invention relates to a screw joint with a sealing ring, a connecting piece and a union nut for making a tube connector, the sealing ring being designed as a cutting ring with one or several cutting edges which can be inserted into a conical bore of the connecting piece starting from an end face by screwing the union nut onto the connecting piece, and the sealing ring being provided with an annular reinforcement on the nut side of its outside which forms a ring surface at its transition to the narrow ring portion.

Cutting-ring unions in which the cutting ring used is provided with several cutting edges which are arranged axially one behind the other are known, for instance, from DE 12 96 901. This patent also reveals that the cutting ring is to be provided with a reinforcement pointing radially outward on a portion of its axial length at the end of the nut side. When carrying out the assembly, the cutting ring area is squeezed into the cone of the connecting piece by actuating the screw-on nut, thereby effecting a deflection of the cutting edges towards the tube jacket and cutting into the jacket. The annular reinforcement on the nut side brings about a limitation of the range of deflection and, thus, stabilization of the cutting ring.

A screw joint with a cutting ring which is provided with a reinforcement designed as ribs and spread over the circumference is known from DE 33 41 726. The ribs point radially outward and extend axially. At their end facing the nut, they are provided with a stop face adapted to the conical bore of the nut. With their other end, they form a stop face with the end face of the connecting piece. As soon as the named stop faces reach their respective counterfaces, the torque to be applied by the fitter increases sharply, indicating the end of the assembly operation.

The assembly instructions for cutting-ring screw joints according to DIN 3859, Part 2, specify that the union has to be assembled after finger-tight screwing with 1½ turns of the union nut (complete assembly). After a disassembly, however, it is no longer objectively discernible, whether these instructions have been carried out correctly. According to the assembly instructions, a visual assessment of the collar throw-up caused by the cutting edges is carried out. However, such an assessment is always subjective and depends on the experience of the fitter. The assembly operation carried out is not verifiable at the stop faces and the collar throw-up on the tube jacket. Even if overtightening was carried out, this cannot be clearly recognized by viewing the stop faces and the collar throw-up.

Therefore, the object of the invention is to indicate means by which the quality of a completed assembly operation is objectively discernible and can be demonstrated at any time by disassembly of the system.

According to the invention, the solution of this task is achieved in that the annular face resulting from the reinforcing portion of the cutting ring is provided with an inclination between 45° and 90°, in relation to the tube axis, and that the axial length of the annular reinforcement is of such a size that, in case of complete assembly, the transfer elements arranged on the annular face transfer their negative image formation or themselves onto the end face of the connecting piece.

According to the invention, the transfer elements have spatially designed contours whose negative image formation is transferable onto the end face of the connecting piece. Similar to an embossing die, the negative image is embossed into the end face of the connecting piece by the squeezing force exerted by the fitter. This operation is assisted by the fact that the surface of the cutting ring is hardened so that, in contrast, the end face of the connecting piece has a lesser hardness, thereby facilitating the embossing operation.

In a simplified embodiment, the transfer elements are designed as corrugated elements. Such an embossed pattern can be easily made, is visually discernible without problem and, in addition, is safely palpable in bad visibility conditions.

In a further variation of the invention, the transfer elements are designed as company logos.

In a further embodiment of the invention, the transfer elements are designed as dye pigments. As a result of the buildup of the annular face of the cutting ring onto the end face of the connecting piece during the initial assembly, the assembly torque increases sharply and transfers the transfer elements onto the end face of the connecting piece. The sharp increase of the assembly torque is a signal for the fitter that assembly has been successfully completed. At the same time, when effecting disassembly, the assembly condition achieved can be objectively verified at the end face of the connecting piece since there must be corresponding embossed patterns or color codes if the initial assembly has been carried out as instructed.

In a variation of the invention, the transfer means can also be used to demonstrate overtightening of the system. In doing so, the axial length $L_1$ of the annular reinforcement is of such a size that transfer elements arranged on the annular face transfer their negative image formation or themselves onto the end face of the connecting piece only in case of over-tightening. In this embodiment, the axial length of the annular reinforcement $L_1$ is, therefore, designed shorter. Consequently, no contact of the ring face of the cutting ring with the end face of the connecting piece takes place in case of complete assembly and the 1½ turns of the union nut to DIN, but only in case of overtightening, i.e. approximately 1¾ turns of the union nut. Provided assembly is correct, the shortened annular reinforcement $L_1$ will have a relatively low stiffness, thus dampening vibration transmissions similar to the effect of metallic springs.

SUMMARY OF THE INVENTION

The invention relates to a screw joint with a sealing ring, a connecting piece and a union nut for making a tube connector, the sealing ring being designed as a cutting ring with one or several cutting edges which can be inserted into a conical bore of the connecting piece starting from an end face by screwing the union nut onto the connecting piece, and the sealing ring being provided with an annular reinforcement on the nut side of its outside which forms a ring surface at its transition to the narrow ring portion. The annular face resulting from the reinforcing portion of the cutting ring is provided with an inclination between 45° and 90° in relation to the tube axis and the axial length of the annular reinforcement is of such a size that, in case of complete assembly, the transfer elements arranged on the annular face transfer their negative image formation or themselves onto the end face of the connecting piece.

The transfer elements have spatially designed contours whose negative image formation is transferable onto the end face of the connecting piece. Similar to an embossing die, the negative image is embossed into the end face of the connecting piece by the squeezing force exerted by the fitter.

DETAILED DESCRIPTION OF THE DRAWINGS

A detailed explanation of the invention is given in the accompanying drawings wherein.

DETAILED DESCRIPTION OF THE PREFERRED EMBODIMENT

Figure 1:
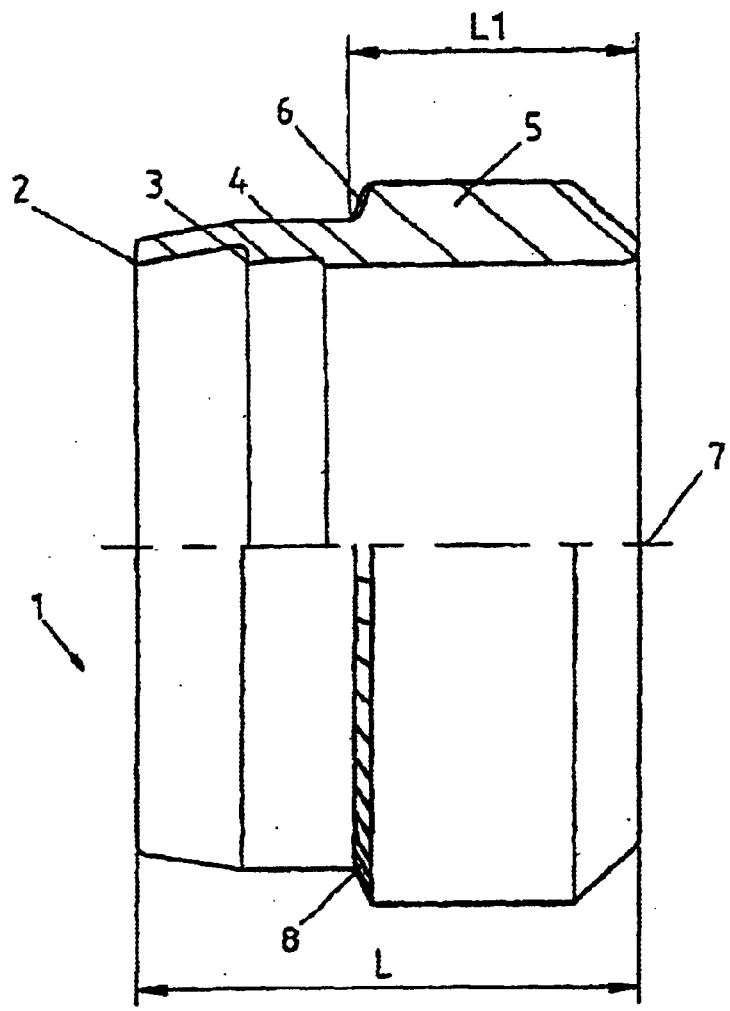
FIG. 1 shows a semi-sectional view of a cutting ring according to the invention.

FIG. 1 shows a longitudinal partial section and a partial view of a cutting ring 1 according to the invention having the cutting blades 2 and 3 and the cutting blade or stop edge 4 with different radii. On its outer face there is provided an annular reinforcement 5 on the nut side, which forms an annular face 6 at its transition to the narrow ring portion. The annular face 6 has an inclination in relation to the tube axis 7, which is between 45° and 90°. In the one embodiment of the invention, the axial length $L_1$ of the annular reinforcement is of such a size that, in case of complete assembly, the transfer elements 8 arranged on the annular face 6 transfer their negative image formation of themselves onto the end face 9 of the connecting piece 10.

Figure 2:
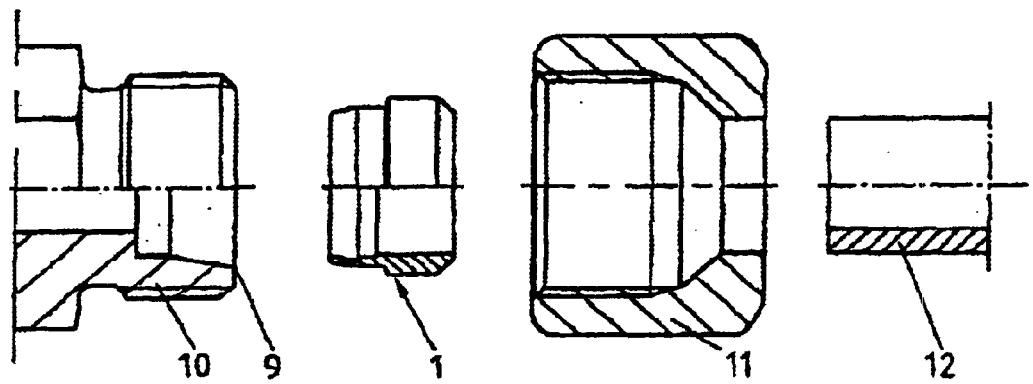
FIG. 2 shows an exploded view of all components of a screw joint in semi-section and full section according to the invention.

In this connection, reference is made to FIG. 2 showing an exploded view of all components of a screw joint in longitudinal partial section and in a partial view according to the invention, with 10 depicting the connecting piece, 1 the cutting ring, 11 the union nut and 12 the tube to be connected.

Figure 3:
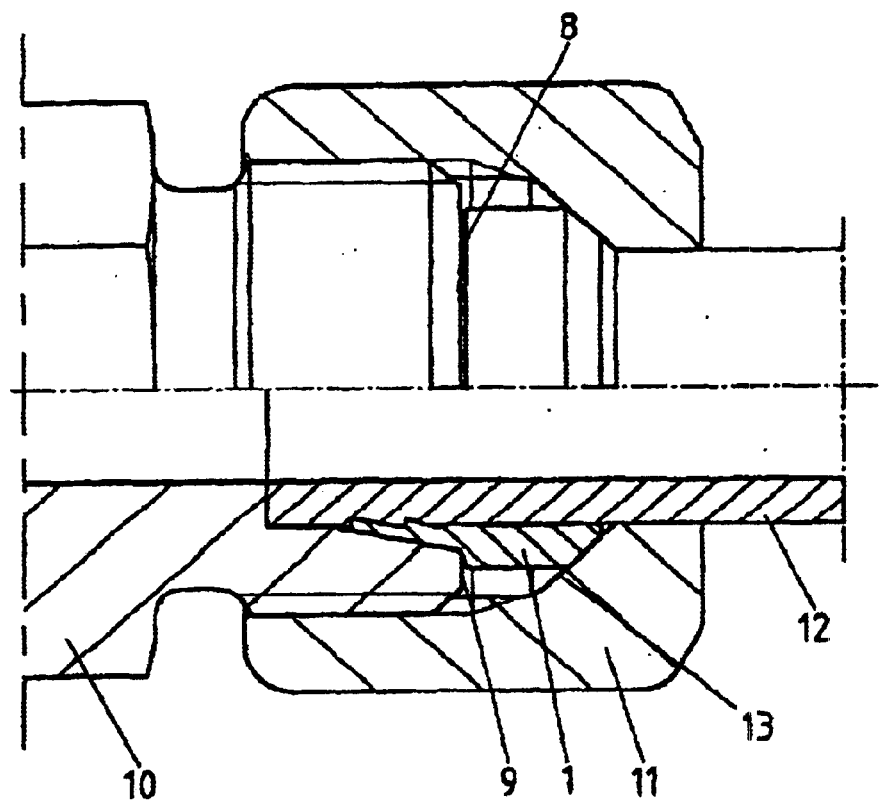
FIG. 3 shows a semi-sectional view of a correctly assembled screw joint according to a first variant of the invention.

FIG. 3 shows the elements in correctly assembled condition. Following finger-tight tightening, the union nut 11 which, with its inner face 13, is acting onto the correspondingly designed inclined surface of the cutting ring 1 and, with the annular face 6 of cutting ring 1 striking the end face 9 of the connecting piece 10, is given 1½ turns. This causes the transfer elements 8 to be squeezed into the softer end face 9 of the connecting piece and to effect a negative image formation thereof. If the screw joint is disassembled, the image on the end face 9 will demonstrate that the screw joint was assembled correctly.

Figure 4:
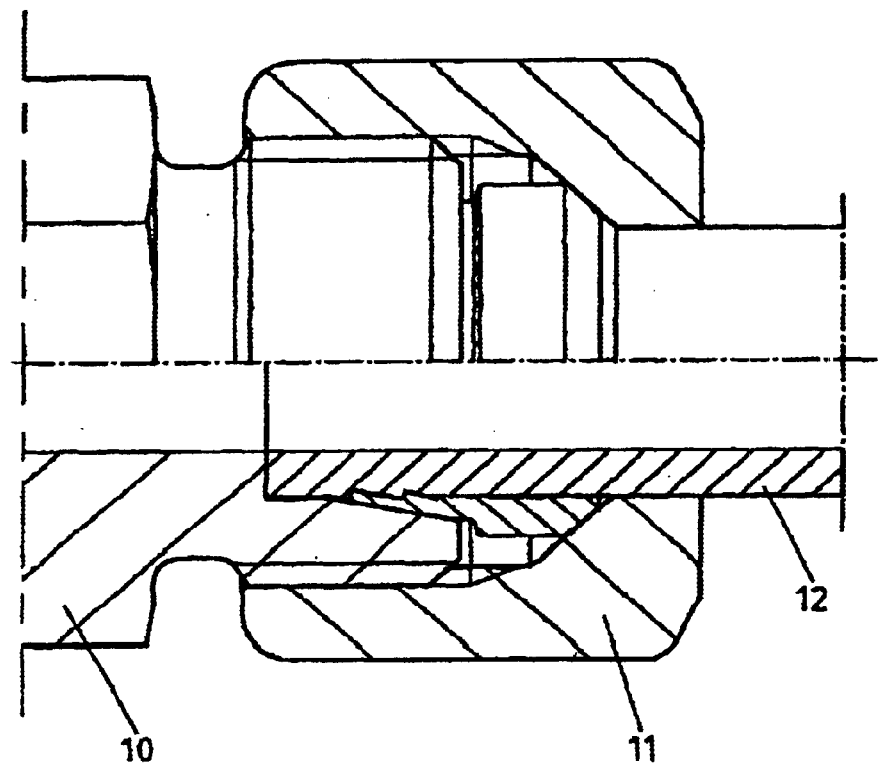
FIG. 4 shows a semi-sectional view of a correctly assembled screw joint according to a second variant of the invention.
Figure 5:
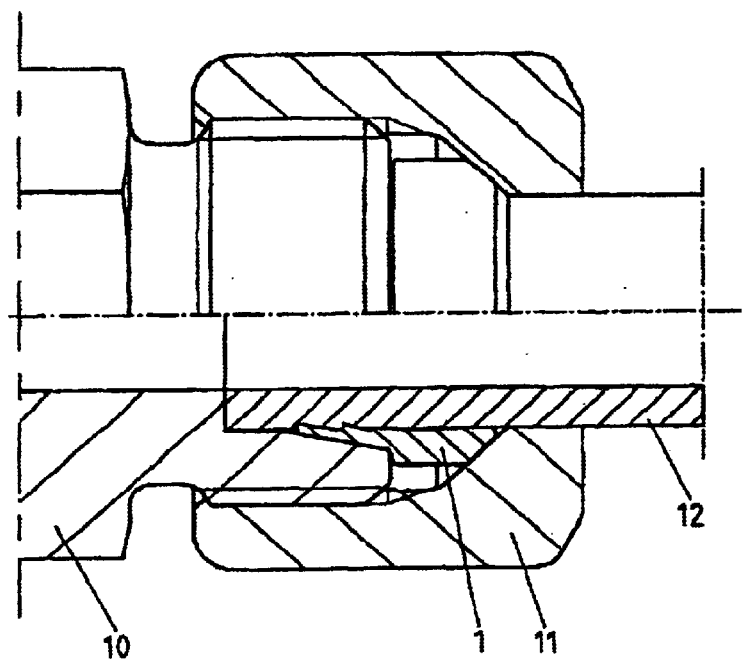
FIG. 5 shows a semi-sectional view of an overtightened screw joint according to a second variant of the invention.

FIG. 4 shows a further embodiment of the invention in which it is not the correct assembly condition of a marking and, thus, a verification by an embossed pattern on the end face 9 of the connecting piece 10 which is achieved, but an overtightening. For this purpose, the length $L_1$ of the annular reinforcement is shortened, with equal axis length L of the cutting ring 1, in such a way that, with correct assembly of the tube connector, the annular face 6 will not make contact with the end face 9 of the connecting piece 10 with its contours or transfer elements 8, so that no embossed pattern is created. It is only upon overtightening, i.e. upon giving the union nut approximately 1¾ turns, that a squeezing action is exerted from the annular face 6 onto the end face 9 of the connecting piece 10, thereby achieving an embossed pattern of the end face and, thus, an identification of the overtightening which has occurred. This condition is shown in FIG. 5.

Figure 6:
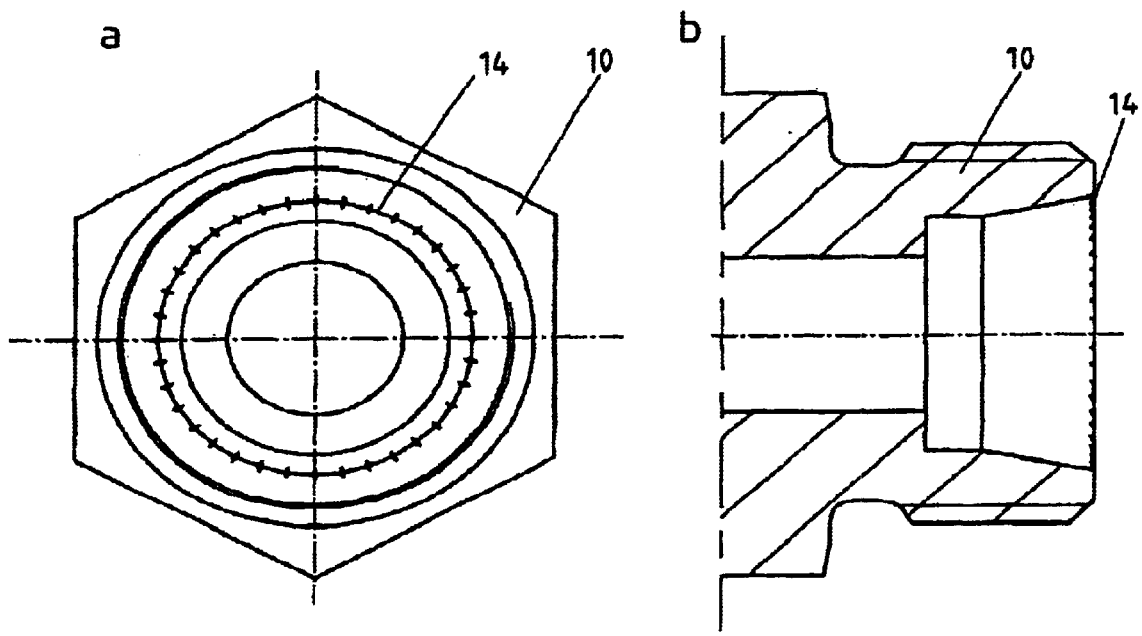
FIG. 6a shows a side elevation of a connecting piece with a marking.
FIG. 6b shows a longitudinal section of the connecting piece with the marking.

FIGS. 6a and 6b show an exemplified illustration of the marking of the end face edge 14 of the connecting piece 10 for identification of: 1) an overtightening with a shortened annular reinforcement $L_1$, and 2) a normal assembly with an extended annular reinforcement $L_1$.

What is claimed is:

1. A screw joint with a sealing ring, a connecting piece, and a union nut for making a tube connector; the sealing ring comprising a cutting ring with one or several cutting edges, the sealing ring insertable into a conical bore of the connecting piece and the union nut threadably connectable to the connecting piece to capture the sealing ring between the connecting piece and the union nut, the sealing ring including an external annular reinforcement on a nut side portion which forms an annular face at a transition from the annular reinforcement to a narrow ring portion, the annular face having an inclination between 45° and 90° in relation to a longitudinal axis of the tube connector and wherein the annular reinforcement has an axial length $L_1$ such that upon assembly, transfer elements arranged on the annular face transfer a negative image formation or themselves onto an end face of the connecting piece.

2. A screw joint as claimed in claim 1, wherein the transfer elements have spatially designed contours whose negative image formation is transferable onto the end face of the connecting piece.

3. A screw joint as claimed in claim 1, wherein the transfer elements are embossed patterns.

4. A screw joint as claimed in claim 1, wherein the transfer elements are corrugated elements.

5. A screw joint as in claim 1, wherein the axial length L1 of the annular reinforcement is of a predetermined length such that transfer elements arranged on the annular face transfer their negative image formation onto the end face of the connecting piece only when the union nut is overtightened on the connecting piece.

6. A screw joint as in claim 1, wherein the axial length $L_1$ of the annular reinforcement is of a predetermined length such that transfer elements arranged on the annular face transfer their negative image formation onto the end face of the connecting piece only when a recommended torque on the union nut has been exceeded.

7. A screw joint comprised of a sealing ring, a connecting piece and a union nut for a tube connector;
said sealing ring having a nut side portion located on a first axial end with an annular reinforcement, a narrow ring portion on an opposite axial end, a ring surface having an annular face with transfer elements arranged thereupon located at a transition from said narrow ring portion to said annular reinforcement, said annular face having an inclination between 45° and 90° relative to a longitudinal axis of said tube connector, and at least one cutting edge on an interior surface of the sealing ring;

said connecting piece having a conical bore at one end, and an annular end face located at the one end of the connecting piece;

wherein upon assembly of said union nut onto said connecting piece, said sealing ring narrow ring portion is positioned within said conical bore, contacts said connecting piece, and can cause said transfer elements of said ring surface annular face to transfer a negative image formation onto said connecting piece end face.

8. The screw as in claim 7, wherein said ring surface forms an obtuse angle with said narrow ring portion.

9. The screw joint as in claim 7, wherein said transfer elements are comprised of a plurality of spatially designed contours.

10. The screw joint as is claim 7, wherein said transfer elements are comprised of a plurality of embossed patterns.

11. The screw joint as in claim 7, wherein said transfer elements are comprised of a plurality of corrugated elements.

12. The screw joint as in claim 7, wherein said transfer elements arranged on the annular face transfer their negative image formation when a maximum intended tightening of said union nut on said connecting piece has been exceeded.

13. The screw joint as in claim 7, wherein said ring surface annular face has a greater hardness than said connecting piece end face.

14. The screw joint as in claim 7, wherein the annular reinforcement has a predetermined length such that the transfer elements arranged on the annular face transfer their negative image formation onto the end face of the connecting piece only when a recommended torque on the union nut has been exceeded during assembly.

15. The screw joint as in claim 7, wherein the end face of the connecting piece is in opposing, surface-to-surface relation with the ring surface of the sealing ring.

16. A sealing ring having a nut side portion located on a first axial end with an annular reinforcement, a narrow ring portion on an opposite axial end, a ring surface having an annular face with transfer elements arranged thereupon located at a transition from said narrow ring portion to said annular reinforcement, said annular face having an inclination between 45° and 90° relative to a longitudinal axis of the sealing ring, and at least one cutting edge on an interior surface of the sealing ring, wherein said narrow ring portion can be inserted within a conical bore of a connecting piece to contact said connecting piece causing said transfer elements on said ring surface annular face to transfer a negative image formation or themselves onto the connecting piece when a union nut is assembled onto the connecting piece.

17. The sealing ring as in claim 16, wherein said transfer elements are comprised of a plurality of spatially designed contours.

18. The sealing ring as in claim 16, wherein said transfer elements are comprised of a plurality of embossed patterns.

19. The sealing ring as in claim 16, wherein said transfer elements are comprised of a plurality of corrugated elements.

20. A method of transferring a negative image formation of a transfer element arranged on an annular face of a ring surface, located on a sealing ring, to an end face of a connecting piece, said method comprising the steps of:
locating said sealing ring inside a union nut, said union nut having an internal threaded portion;
inserting a cylindrical tube into said sealing ring;
tightening said union nut onto said connecting piece a predetermined amount, with the internal threaded portion of said union nut interengaging an external threaded portion of said connecting piece, such that a narrow ring portion at one end of said sealing ring is received in a conical bore of said connecting piece and is radially squeezed thereby, such that an at least one cutting edge located along an interior surface of said sealing ring cuts into a jacket of said tube; and
contacting said annular face of said ring surface, located at a transition from said narrow ring portion of said sealing ring to an enlarged annular reinforcement at an opposite end of said sealing ring, with the end face of said connecting piece such that said transfer element is embossed into the end face of said connecting piece.

21. The method of transferring a negative image formation of a transfer element as in claim 20, wherein the transfer element comprises spatially designed contours.

22. A screw joint comprised of:
a sealing ring having: i). a nut side portion at a first axial end with an enlarged annular reinforcement, ii). a narrow ring portion at an opposite axial end, and iii). a ring surface having an annular face with transfer elements arranged thereupon located at a transition from said narrow ring portion to said enlarged annular reinforcement, said annular face having an inclination between 45° and 90° relative to a longitudinal axis of the sealing ring, and at least one cutting edge on an interior surface of the sealing ring;
a union nut receiving and locating said sealing ring;
a connecting piece adjoined to said union nut, said connecting piece having a conical bore at one end receiving said narrow ring portion, and an end face located at the one end in contact with the ring surface of said sealing ring, the connecting piece having a negative image formation of said transfer elements embossed on its end face; and
a tube, having an outer jacket, located within said sealing ring, said union nut and said connecting piece cooperating and forcing the at least one cutting edge of the sealing ring into the outer jacket of the tube.

23. The screw joint as in claim 22, wherein said transfer elements are comprised of a plurality of spatially designed contours.

24. The screw joint as in claim 22, wherein said transfer elements are comprised of a plurality of embossed patterns.

25. The screw joint as in claim 22, wherein said transfer elements are comprised of a plurality of corrugated elements.

26. The screw joint as in claim 22, wherein the end face of the connecting piece is in opposing, surface-to-surface relation with the ring surface of the sealing ring.

27. A screw joint comprised of a sealing ring, a connecting piece and a union nut;
said sealing ring having: i). a nut side portion at a first axial end with an enlarged annular reinforcement, ii). a narrow ring portion at an opposite axial end, and iii). a ring surface having an annular face with transfer elements arranged thereupon located at a transition from said narrow ring portion to said enlarged annular reinforcement, said annular face having an inclination between 45° and 90° relative to a longitudinal axis of said sealing ring, and at least one cutting edge on an interior surface of said sealing ring;
said connecting piece having a conical bore at one end, and an end face located at the one end of the connecting piece, the sealing ring located in the conical bore of the connecting piece, and the union nut threaded onto the connecting piece to capture the sealing ring between the union nut and the connecting piece, the annular reinforcement having a predetermined length such that upon proper tightening of the union nut onto the connecting piece, the ring surface annular face is spaced from the end face of the connecting piece, and upon over-tightening of the union nut on the connecting piece, the ring surface annular face contacts said connecting piece end face causing said transfer elements of said ring surface annular face to transfer a negative image formation onto said connecting piece end face.

28. The screw joint as in claim 27, wherein said transfer elements are comprised of a plurality of spatially designed contours.

29. The screw joint as in claim 27, wherein said transfer elements are comprised of a plurality of embossed patterns.

30. The screw joint as in claim 27, wherein said transfer elements are comprised of a plurality of corrugated elements.

31. A screw joint comprised of, in combination:

a sealing ring having: i). a nut side portion located at a first axial end with an enlarged annular reinforcement, ii). a narrow ring portion at an opposite axial end, and iii). a ring surface having an annular face located at a transition from said narrow ring portion to said enlarged annular reinforcement, said annular face having an inclination between 45° and 90° relative to a longitudinal axis of said sealing ring, and at least one cutting edge on an interior surface of said sealing ring;

a union nut receiving and locating said sealing ring;

a connecting piece threadably connected to said union nut, said connecting piece having a conical bore at one end receiving the narrow ring portion, and an end face located at the one end in contact with said ring surface of said sealing ring;

a tube, having an outer jacket, located within said sealing ring, said union nut and said connecting piece, in sealing contact with said at least one cutting edge on said sealing ring interior surface; and transfer means on said ring surface annular face for transferring an image onto the connecting piece end face when the union nut is tightened to a predetermined amount onto said connecting piece.

32. A screw joint with a sealing ring, a connecting piece, and a union nut for making a tube connector; the sealing ring comprising a cutting ring with one or several cutting edges, the sealing ring insertable into a conical bore of the connecting piece and the union nut threadably connectable to the connecting piece to capture the sealing ring between the connecting piece and the union nut, the sealing ring including an external annular reinforcement on a nut side portion which forms an annular face at a transition from the annular reinforcement to a narrow ring portion, the annular face having an inclination between 45° and 90° in relation to a longitudinal axis of the tube connector and wherein the annular reinforcement has an axial length $L_1$ such that as the union nut is assembled onto the connecting piece, transfer elements arranged on the annular face can transfer a negative image formation or themselves onto an end face of the connecting piece.

* * * * *